(12) United States Patent
Miyamoto

(10) Patent No.: US 11,758,248 B2
(45) Date of Patent: Sep. 12, 2023

(54) INFORMATION ACQUISITION METHOD AND INFORMATION ACQUISITION DEVICE

(71) Applicant: CASIO COMPUTER CO., LTD., Tokyo (JP)

(72) Inventor: Naotomo Miyamoto, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 306 days.

(21) Appl. No.: 17/079,622

(22) Filed: Oct. 26, 2020

(65) Prior Publication Data

US 2021/0136331 A1    May 6, 2021

(30) Foreign Application Priority Data

Nov. 1, 2019    (JP) ................ 2019-199765

(51) Int. Cl.
| | | |
|---|---|---|
| *H04N 5/225* | (2006.01) | |
| *H04N 23/12* | (2023.01) | |
| *G03B 17/12* | (2021.01) | |
| *H04N 23/55* | (2023.01) | |
| *H04N 23/71* | (2023.01) | |

(52) U.S. Cl.
CPC ............ *H04N 23/12* (2023.01); *G03B 17/12* (2013.01); *H04N 23/55* (2023.01); *H04N 23/71* (2023.01)

(58) Field of Classification Search
CPC ................................................ G03B 2206/00
See application file for complete search history.

(56) References Cited

U.S. PATENT DOCUMENTS

| | | | |
|---|---|---|---|
| 9,705,596 B2 | 7/2017 | Iizuka et al. | |
| 9,918,022 B2 | 3/2018 | Aota | |
| 10,218,439 B2 | 2/2019 | Kikuchi | |
| 2017/0171474 A1* | 6/2017 | Aota ................ | H04N 23/88 |
| 2018/0083702 A1* | 3/2018 | Kikuchi ............ | H04N 9/643 |

FOREIGN PATENT DOCUMENTS

| | | |
|---|---|---|
| JP | 2014183567 A | 9/2014 |
| JP | 2016139998 A | 8/2016 |
| JP | 2017108309 A | 6/2017 |
| JP | 2018050116 A | 3/2018 |
| JP | 2019109174 A | 7/2019 |

OTHER PUBLICATIONS

Japanese Office Action (and English language translation thereof) dated Sep. 7, 2021 issued in counterpart Japanese Application No. 2019-199765.

\* cited by examiner

*Primary Examiner* — Gary C Vieaux
(74) *Attorney, Agent, or Firm* — Holtz, Holtz & Volek PC

(57) ABSTRACT

An information acquisition method implemented by one or more processor, includes: acquiring, for each of frames, a brightness value corresponding to a position of a color filter from a light receiving device including light receiving elements whose light receiving surfaces are covered with color filters, the color filters including the color filter and the color filters comprising at least first color filters transmitting light of a wavelength band corresponding to a first color and second color filters transmitting light of a wavelength band corresponding to a second color; and acquiring information on a mobile device based on difference between brightness values of the position acquired from a plurality of frames and at least one of a threshold for the first color filters and a threshold for the second color filters.

14 Claims, 13 Drawing Sheets

412a

412b

INFORMATION ACQUISITION METHOD AND INFORMATION ACQUISITION DEVICE

CROSS-REFERENCE TO RELATED APPLICATION

This application claims the benefit of Japanese patent application No. 2019-199765 filed on Nov. 1, 2019, the entire disclosure of which is incorporated by reference herein.

FIELD

The present disclosure relates to an information acquisition method and an information acquisition device.

BACKGROUND

Conventionally, in the technical field of the visible light communication, a visible light communication system is proposed that includes (i) a transmitter that is a signal source that substitutes, for combinations of three primary colors (RGB) of red (R), green (G) and blue (B), information to be transmitted and changes these colors timewise to emit light and (ii) a camera that successively captures an image of a space included in the transmitter, and decodes the information from a temporal change in the color of the light emitted from the transmitter (change in time direction).

In this visible light communication system, so-called development processing is performed in which image analog data indicating an amount of received light for each pixel by which images are successively formed on an imaging sensor is converted into a digitized color in order to identify frame-by-frame which of the three primary colors is in the colored light emitted from the transmitter, (ii) an image of the transmitter is identified from the color image, and information is decoded based on change in time direction of the color occurring in this identified image of the transmitter (Unexamined Japanese Patent Application Publication No. 2014-183567).

SUMMARY

An information acquisition method implemented by one or more processor, according to one aspect of the present disclosure includes (i) acquiring, for each of frames, a brightness value corresponding to a position of a color filter from a light receiving device including light receiving elements whose light receiving surfaces are covered with color filters (S101), the color filters including the color filter and the color filters comprising at least first color filters transmitting light of a wavelength band corresponding to a first color and second color filters transmitting light of a wavelength band corresponding to a second color, and (ii) acquiring information on a mobile device based on difference between brightness value of the position acquired from a plurality of frames and at least one of a threshold for the first color filters and a threshold for the second color filters (S106).

BRIEF DESCRIPTION OF THE DRAWINGS

A more complete understanding of this application can be obtained when the following detailed description is considered in conjunction with the following drawings, in which.

DETAILED DESCRIPTION

A visible light communication system as an information processing system according to a present embodiment is described below with reference to the drawings.

Figure 1:
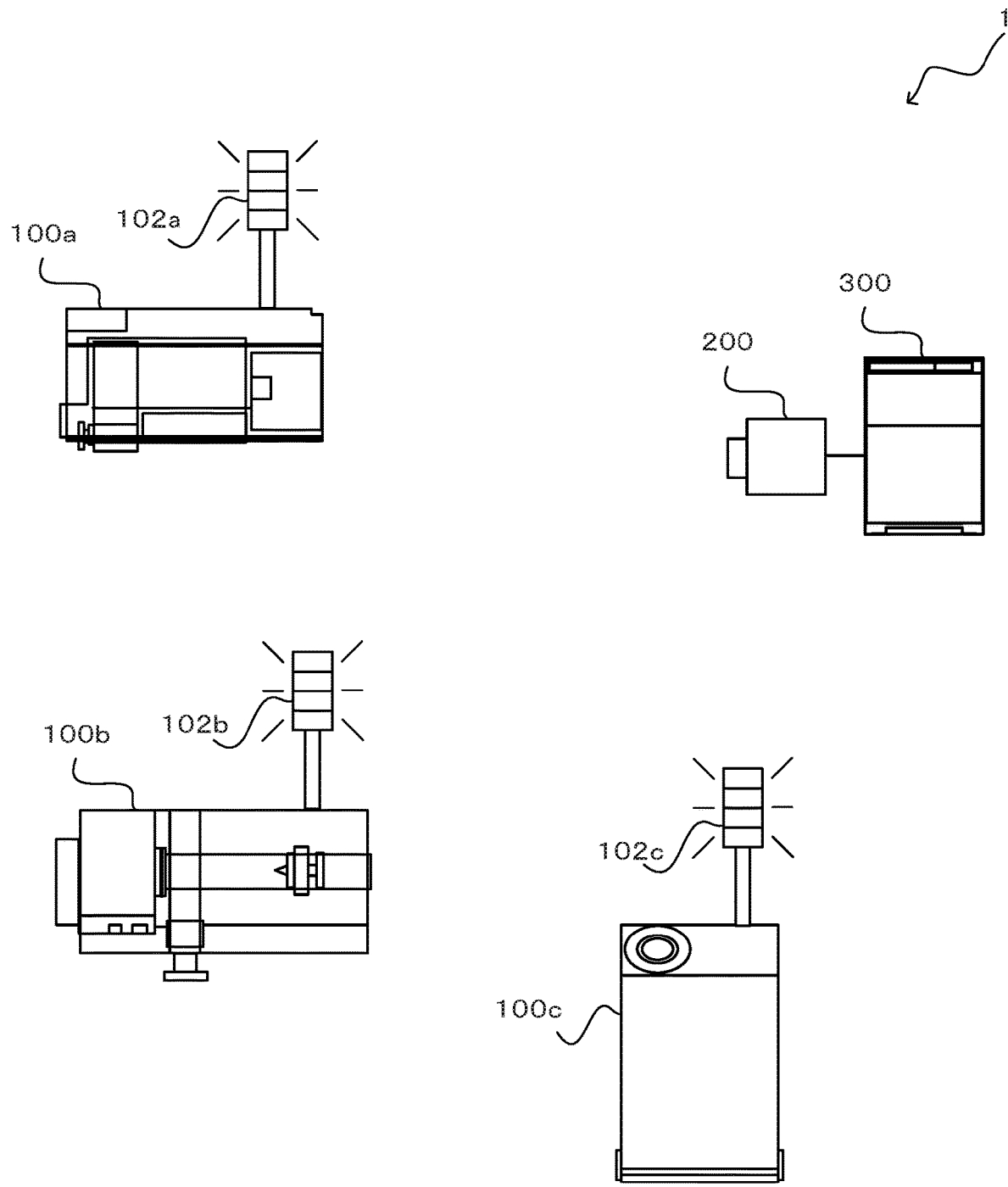
FIG. 1 is a view illustrating one example of a visible light communication system according to an embodiment.

FIG. 1 is a view illustrating one example of a configuration of the visible light communication system. As illustrated in FIG. 1, the visible light communication system 1 is configured to include mobile devices 100a, 100b and 100c (each of which is simply referred to as "mobile device 100" hereinafter as necessary unless description of the mobile devices is limited to one of the mobile devices), a camera 200, and a server 300. The mobile device 100a includes a light emitting diode (LED) 102a that is a marker, the mobile device 100b includes a LED 102b, and the mobile device 100c includes a LED 102c (each of the LEDs 102a, 102b and 102c is simply referred to as "LED 102" hereinafter as necessary unless description of the LEDs is limited to one of the LEDs). The server 300 is connected to the camera 200.

In the present embodiment, the LED 102 in the mobile device 100 emits light that is modulated by change of color phase in temporal direction, thereby transmitting identification (ID) of the mobile device 100 the ID being information on a transmission subject. The camera 200 captures an image of a space including the LEDs. The server 300 acquires, from the image of light acquired by the photography by the camera 200, information on the ID of the mobile device 100 and the like.

Figure 2:
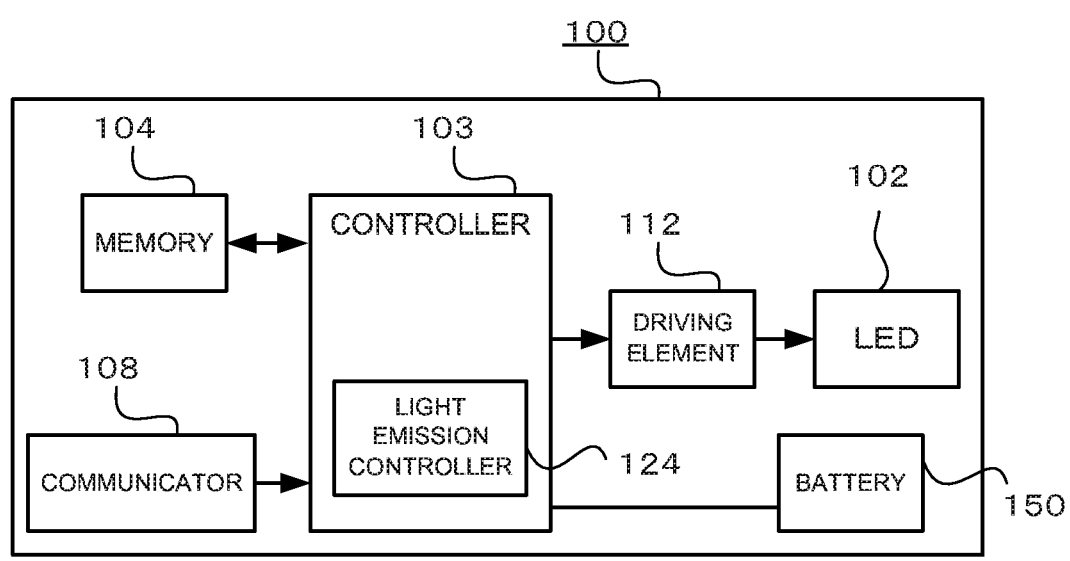
FIG. 2 is a view illustrating one example of a configuration of a mobile device according to the embodiment.

FIG. 2 is a view illustrating one example of a configuration of the mobile device 100. As illustrated in FIG. 2, the mobile device 100 includes the LED 102, a controller 103, a memory 104, a communicator 108, a driving element 112 and a battery 150.

The controller 103 includes, for example, a central processing unit (CPU). The controller 103 executes software processing based on a program stored in the memory 104, thereby controlling various types of functions of the mobile device 100.

The memory 104 is, for example, a random access memory (RAM) or a read only memory (ROM). The memory 104 stores various types of information (such as a program) used for control in the mobile device 100 and the like. The communicator 108 is, for example, a local area network (LAN) card. The communicator 108 communicates with another communication device. The battery 150 supplies, to each component, electric power necessary for operation of the mobile device 100.

The controller 103 includes a light emission controller 124. The light emission controller 124 determines, in accordance with the ID of the mobile device 100 or the like, a light-emission pattern of emission of predetermined light that includes freely-selected information and that is modulated with respect to a change in the color phase of light emitted by the LED 102.

Additionally, the light emission controller 124 outputs, to the driving element 112, information on the light-emission pattern corresponding to the ID or the like. The driving element 112 generates, in accordance with the information on the light-emission pattern from the light emission controller 124, a drive signal for time-wise change of a color phase and a brightness value of light emitted by the LED 102. The LED 102 emits, in accordance with the drive signal output by the driving element 112, light whose color phase and brightness value change in a time-wise manner. The color of the emitted light is among three primary colors and is one of red (R), green (G) and blue (B) that are colors of wavelength bands used for color modulation in visible light communication.

Figure 3:
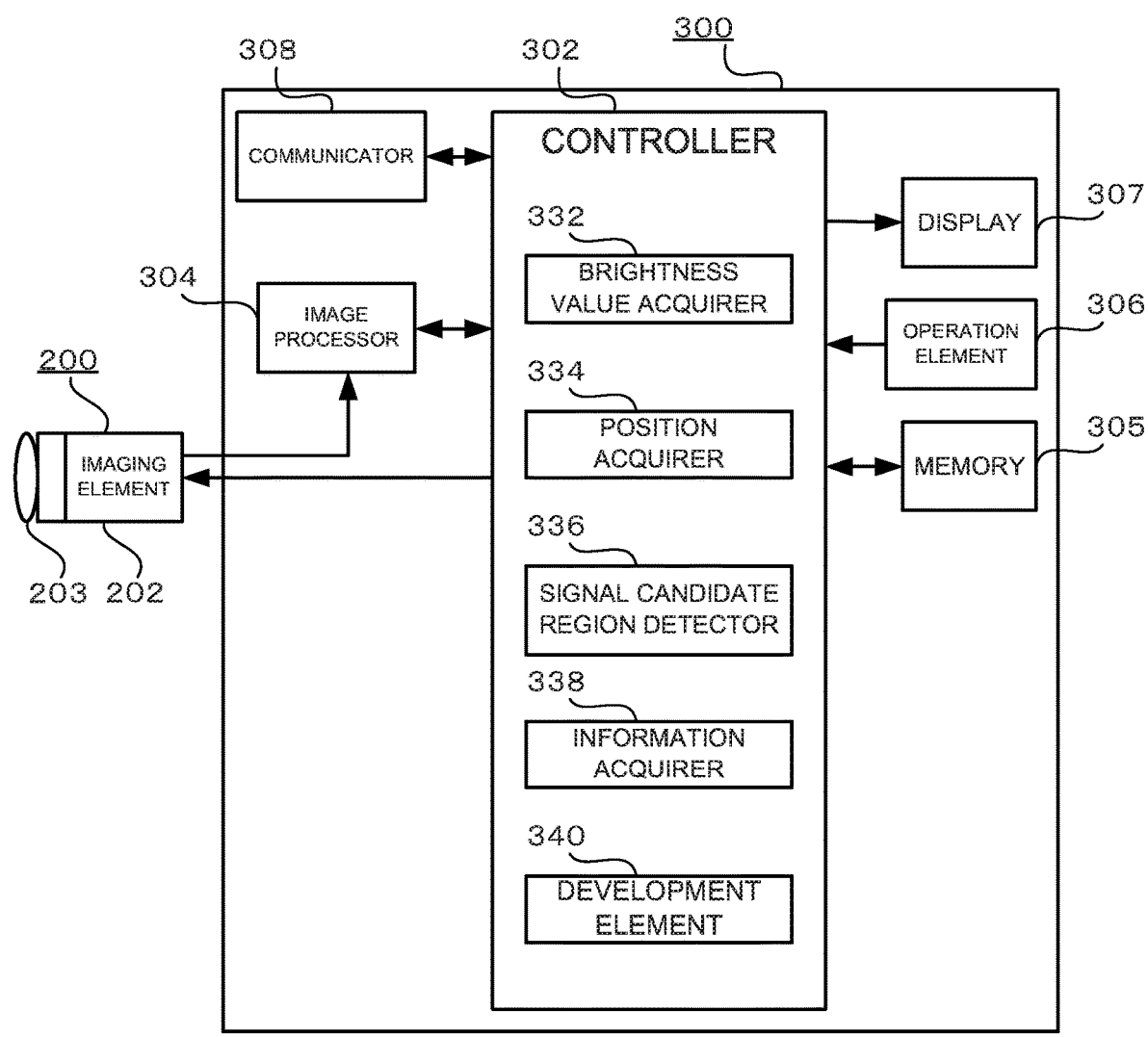
FIG. 3 is a view illustrating an example configuration of a camera and a server according to the embodiment.

FIG. 3 is a view illustrating an example configuration of the camera 200 and the server 300. As illustrated in FIG. 3, the camera 200 includes an imaging element 202 and a lens 203. The server 300 includes a controller 302, an image processor 304, a memory 305, an operation element 306, a display 307 and a communicator 308.

The lens 203 in the camera 200 includes a zoom lens and the like. The lens 203 moves by operation of zoom control by the operation element 306 in the server 300 and operation of focus control by the controller 302. By the movement of the lens 203, an angle of view of imaging by the imaging element 202 and an optical image are controlled.

A light receiving surface of the imaging element 202 including an imaging surface is formed by light receiving elements that are regularly arranged in a two-dimensional array. The light receiving elements are, for example, imaging devices such as a charge coupled device (CCD), a complementary metal oxide semiconductor (CMOS), and the like. The imaging element 202 (i) captures, based on a control signal from the controller 302 in the server 300, an optical image of light entering through the lens 203 at an angle of view for imaging in a predetermined range (received light) and (ii) converts an image signal in the angle of view for imaging to digital data to generate frames. Also, the imaging element 202 continuously in a time-wise manner performs imaging and generation of the frames and outputs the successive frames to the image processor 304.

Figure 4:
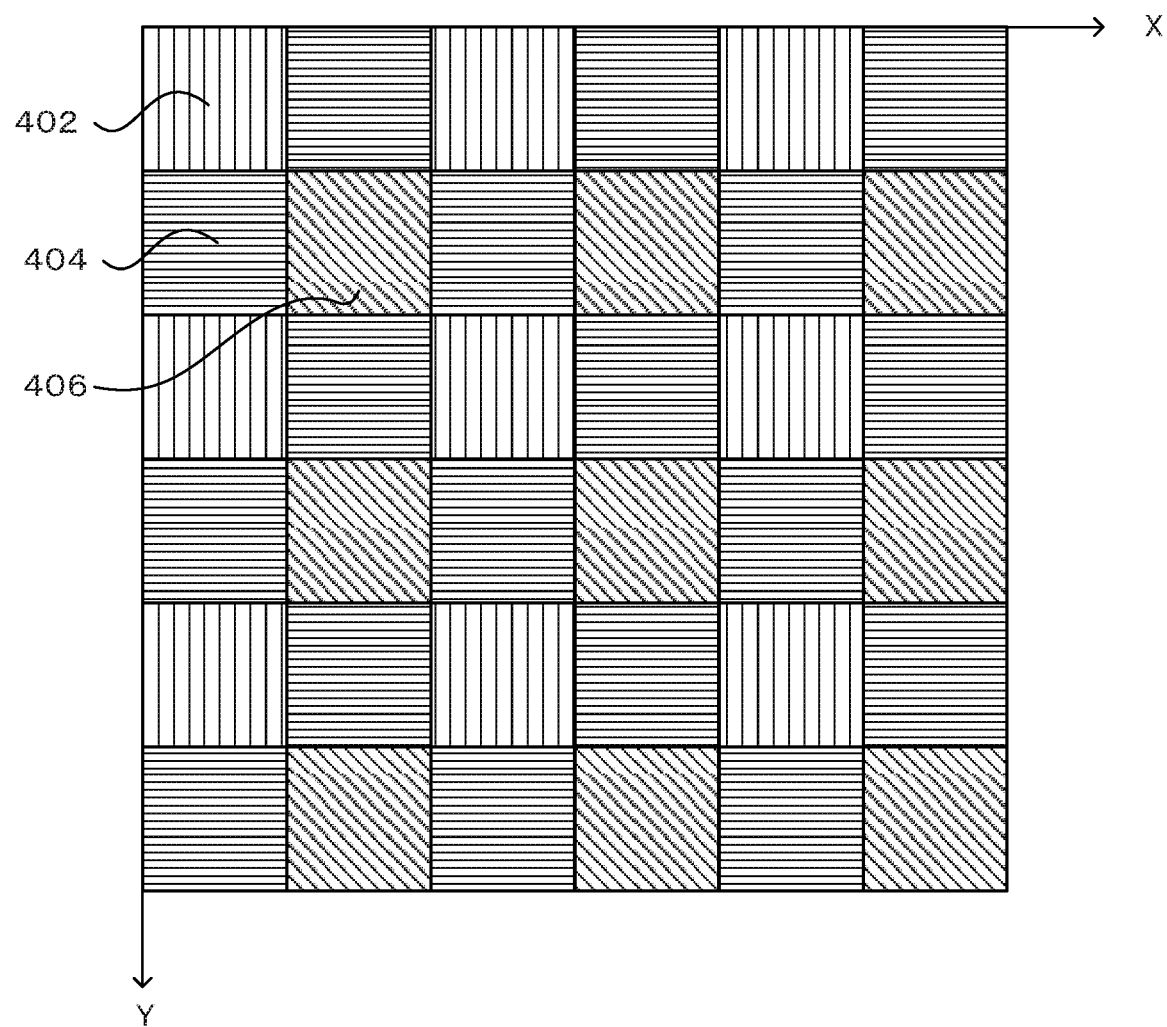
FIG. 4 is a view illustrating one example of a Bayer arrangement of color filters according to the embodiment.

Color filters are arranged on the light receiving surface in a Bayer array. As illustrated in FIG. 4, each of the color filters arranged in a Bayer array corresponds to one pixel, and the color filters include (i) red filters (first color filters) 402 that are filters having the peak of light transmission in a wavelength band corresponding to red (a first color), (ii) green filters (second color filters) 404 that are filters having the peak of light transmission in a wavelength band corresponding to green (a second color), and (iii) blue filters (third color filters) 406 that are filters having the peak of light transmission in a wavelength band corresponding to blue (a third color). Specifically, the color filters arranged in a Bayer array have (i) first rows in which the red filters 402 and the green filters 404 are arranged alternatingly in the transverse direction and (ii) second rows in which the green filters 404 and the blue filters 406 are arranged alternatingly in the transverse direction, and the first rows and the second rows are arranged alternatingly in the vertical direction.

When the X-axis and the Y-axis are defined as illustrated in FIG. 4, numbers from zero are assigned in the X-axis direction, numbers from zero are assigned in the Y-axis direction, and when symbols n and m denote integers, coordinates of the red filters 402 are expressed by (2n, 2m), coordinates of the green filters 404 are expressed by (2n, 2m+1) and (2n+1, 2m), and coordinates of the blue filters 406 are expressed by (2n+1, 2m+1).

Based on the control signal from the controller 302, the image processor 304 outputs, to the controller 302, digital data on the frames that is output by the imaging element 202. The digital data on the frames includes the brightness value of each of the pixels included in the frames.

The controller 302 includes, for example, a CPU. The controller 302 executes software processing based on a program stored in the memory 305, thereby controlling various types of functions of the server 300 such as execution of operations described later and illustrated in FIGS. 10 to 13.

The memory 305 is, for example, a RAM or a ROM. The memory 305 stores various types of information, such as programs, used for control in the server 300 and the like.

The operation element 306 includes a numeric keypad, function keys or the like and is an interface used for inputting by a user the content of an operation. The display 307 includes, for example, a liquid crystal display (LCD), a plasma display panel (PDP), an electro luminescence (EL) display or the like. The display 307 displays an image based on the image signal output by the controller 302. The communicator 308 is, for example, a LAN card. The communicator 308 communicates with an external communication device.

The controller 302 includes a brightness value acquirer 332, a position acquirer 334, a signal candidate region detector 336, an information acquirer 338, and a development element 340.

Figure 5A:
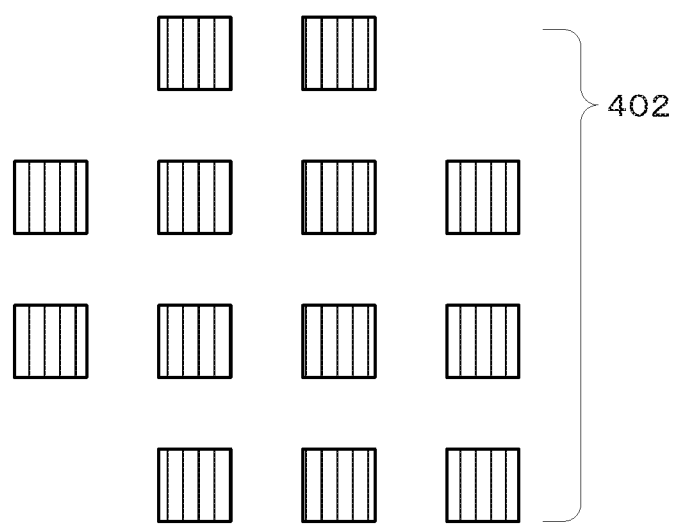
FIG. 5A is a view illustrating one example of a red Bayer image according to the embodiment.
Figure 6A:
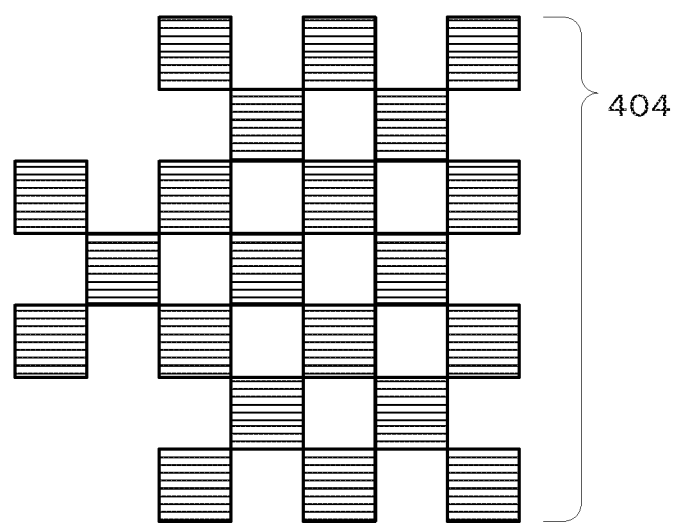
FIG. 6A is a view illustrating one example of a green Bayer image according to the embodiment.
Figure 7A:
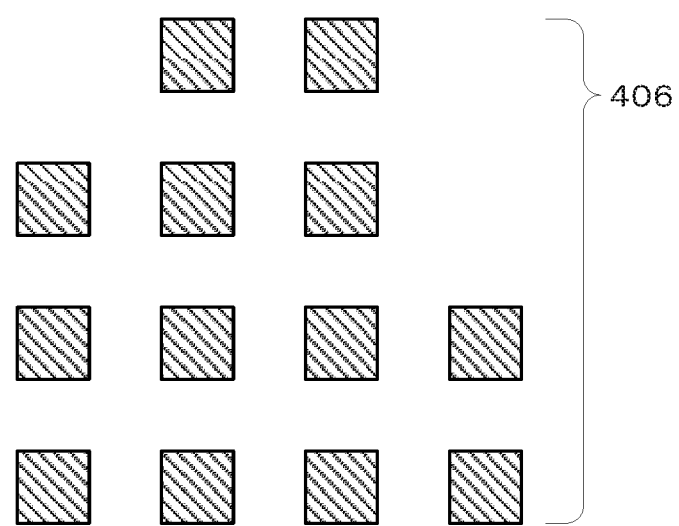
FIG. 7A is a view illustrating one example of a blue Bayer image according to the embodiment.

The brightness value acquirer 332 acquires, for each of the frames output by the imaging element 202, a brightness value of each of the pixels included in the frames. Here, when the LED 102 emits red light, brightness values of pixels corresponding to the red filters 402 become high, and thus a Bayer image as illustrated in FIG. 5A is obtained. When the LED 102 emits green light, brightness values of pixels corresponding to the green filters 404 become high, and thus a Bayer image as illustrated in FIG. 6A is obtained. When the LED 102 emits blue light, brightness values of pixels corresponding to the blue filters 406 become high, and thus a Bayer image as illustrated in FIG. 7A is obtained.

The position acquirer 334 acquires, at times corresponding 5 to the frames, the brightness value of each of the pixels acquired by the brightness value acquirer 332. Here, the imaging element 202 outputs the frames (a captured image) at update timing synchronizing with a change in a color of light emitted by the LED 102. The position acquirer 334 becomes capable of acquiring the brightness value accompanied by the change in a color of light emitted by the LED 102. In the present embodiment, a case is described in which a frame rate matches timing of the change in a color of emitted light. However, in a case in which the timing of the change in a color of emitted light is longer than the frame rate, the LED 102 emitting light having the same color is detected using successive frames. In such a case, as described later, a difference between brightness values cannot be obtained using a current frame and the immediately previous frame just before the current frame. Accordingly, for example, a setting is used such that the difference between brightness values is obtained using the current frame and a frame just before the immediately previous frame. That is, selection of frames for detecting the difference between brightness values is determined by the timing of the change in a color of emitted light and a frame rate set by the imaging element 202, and a frame used for obtaining the difference between brightness values is not limited to the immediately previous frame just before the current frame as long as the frame used for obtaining the difference is a frame imaged before the current frame.

Next, the position acquirer 334 performs processing using the difference between brightness values of attention-focused pixels in frames after focusing attention on each of the pixels forming the frames (that is, processing of determining a color of emitted light from a difference between brightness values in the time direction).

Specifically, the position acquirer 334 first identifies a color of a color filter corresponding to a position of a pixel on which the position acquirer focuses attention (which is referred to as "attention-focused pixel" hereinafter). The memory 305 stores, as information on the color filters arranged in a Bayer array illustrated in FIG. 4, information including information on an association between positions of colors of the color filters and the colors of the color filters. The position acquirer 334 identifies, based on the information on the color filters of the Bayer array stored in the memory 305 and the position of the attention-focused pixel, the color of the color filter corresponding to the position of the attention-focused pixel.

Next, the position acquirer 334 determines whether the difference between brightness values of the current frame acquired for the attention-focused pixel and the immediately previous frame is equal to or greater than a threshold.

Figure 8A:
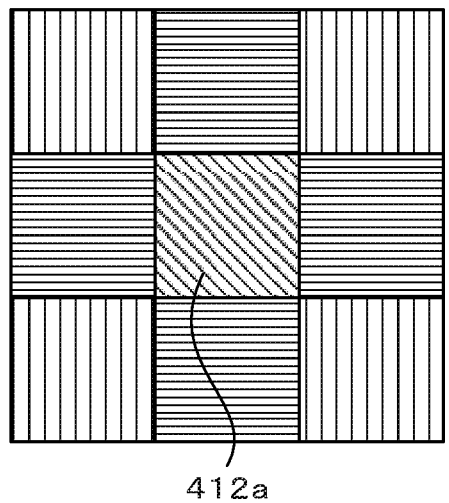
FIG. 8A is a view illustrating one example of a state in which blue light is emitted in the embodiment.
Figure 8B:
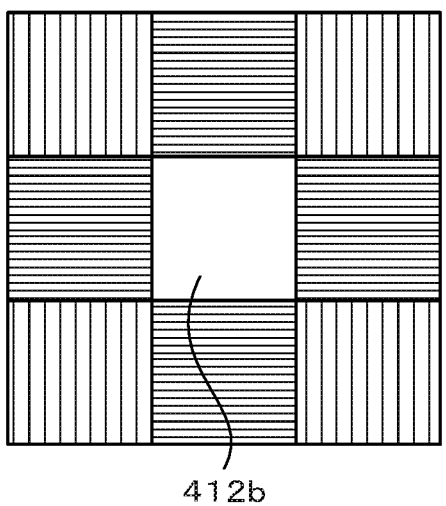
FIG. 8B is a view illustrating one example of a state in which emission of the blue light is stopped in the embodiment.

For example, as illustrated in FIG. 8A, when the LED 102 emits blue light in the current frame, a brightness value of the pixel 412a corresponding to the blue filters 406 is high. Also, as illustrated in FIG. 8B, when the LED 102 does not emit blue light in the immediately previous frame, the position acquirer focuses attention on a fact that a brightness value of the pixel 412b corresponding to the blue filters 406 is low, and the position acquirer 334 determines whether the difference between the brightness values of the frames regarding the attention-focused pixels is greater than a threshold (that is referred to as "time direction difference threshold").

Additionally, when the difference is greater than the temporal direction difference threshold, the position acquirer 334 regards the attention-focused pixels as pixels, referred to as "time direction signal candidate pixels", that are likely to be located at the positions of the LED 102 (signal candidate).

The time direction difference threshold is stored in the memory 305. The time direction difference threshold varies in accordance with colors of the filters. In a range of the brightness value of 0 to 255, for example, the time direction difference threshold is equal to 30 in the case of red, 50 in the case of green, or 25 in the case of blue. The position acquirer 334 reads, from the memory 305, the time direction difference thresholds of the colors of the filters corresponding to positions of the focused pixels. Additionally, the position acquirer 334 (i) calculates a difference between brightness values of the frames regarding the attention-focused pixels and (ii) determines whether the difference is greater than the time direction difference threshold.

In a case in which the difference between brightness values of the frames regarding the attention-focused pixels is greater than the time direction difference threshold and the attention-focused pixels are the time direction signal candidate pixel, the position acquirer 334 subsequently performs the processing using the difference between the brightness values of the time direction signal candidate pixel and a surrounding pixel (that is, processing of determining a color of emitted light from a difference between brightness values in a spatial direction).

Specifically, the position acquirer 334 first identifies a color of a filter corresponding to a position of the time direction signal candidate pixel. Next, the position acquirer 334 determines whether the difference between the brightness values of the time direction signal candidate pixel and the brightness value of the surrounding pixels peripheral to the time direction signal candidate pixel is equal to or greater than the threshold. Here, the term "surrounding pixel" means a pixel that (i) is located around the time direction signal candidate pixel and (ii) is different from the time direction signal candidate pixel in color of a corresponding filter. The reason why such determination is made is as follows. That is, in a case in which the time direction signal candidate pixel is located at the position of the LED 102, when the LED 102 emits light having a color of a color filter corresponding to the time direction signal candidate pixel, although the brightness value of the time direction signal candidate pixel becomes high, the brightness value of the surrounding pixel becomes low.

Figure 9:
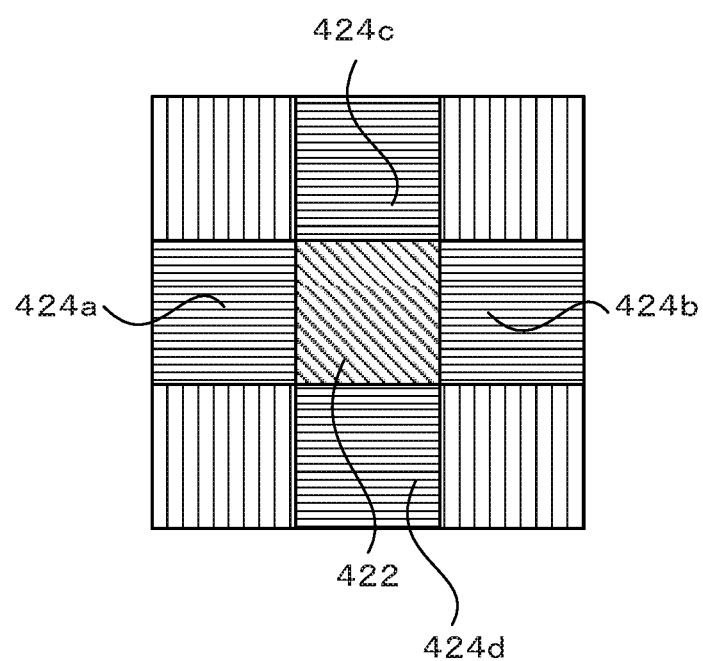
FIG. 9 is a view illustrating one example of a state of a pixel corresponding to blue and pixels surrounding the pixel corresponding to blue in the embodiment.

Accordingly, the position acquirer focuses attention on the fact that there is a difference between the brightness values of the time direction signal candidate pixel and the surrounding pixel when the LED 102 emits light having the color of the color filter corresponding to the time direction signal candidate pixel, for example, the fact that a brightness value of the pixel 422 corresponding to the blue filters 406 is high and brightness values of the pixels 424a, 424b, 424c and 424d corresponding to the green filters 404 are low as illustrated in FIG. 9 when the LED 102 emits blue light, and the position acquirer 334 determines whether a difference obtained by subtracting, from the high brightness value of the time direction signal candidate pixel, the brightness value of the surrounding pixel in a frame detected at the same timing as that of detection of the high brightness value, in other words, in the same frame as that in which the high brightness value is detected, is greater than a threshold that is referred to as a "spatial directional difference threshold". Additionally, when the difference is greater than the spatial directional difference threshold, the position acquirer 334 identifies the time direction signal candidate pixel as located a position of the LED 102, in other words, a pixel of the signal candidate, referred to as a "signal candidate pixel".

The spatial directional difference threshold is stored in the memory 305. The spatial directional difference threshold varies in accordance with colors of the filters. For example, in a range of the brightness value of 0 to 255, the spatial directional difference threshold is equal to 50 in the case of red, 80 in the case of green, or 60 in the case of blue. The position acquirer 334 reads, from the memory 305, the spatial directional difference threshold of a color of a filter corresponding to the position of the time direction signal candidate pixel. Additionally, the position acquirer 334 (i) calculates a difference between the brightness value of the time direction signal candidate pixel and the brightness value of the surrounding pixel in the same frame as that in which the time direction signal candidate pixel is detected and (ii) determines whether the difference is greater than the spatial directional difference threshold.

In a case in which (i) the difference between the high brightness value of the time direction signal candidate pixel and the brightness value of the surrounding pixel in the same frame as that in which the high brightness value is detected is greater than the spatial directional difference threshold, and (ii) the time direction signal candidate pixel is identified as a signal candidate pixel, the signal candidate region detector 336 next performs processing to detect a region of the final signal candidate.

Specifically, the signal candidate region detector 336 first replaces the brightness value of the signal candidate pixel with a constant value. Specifically, the signal candidate region detector 336 (i) assigns a freely-selected value from among values of 0 to 255 of the brightness value, (ii) replaces the signal candidate pixel with the assigned brightness value (a first brightness value), and (iii) further replaces the brightness value of the surrounding pixel existing around the signal candidate pixel with the brightness value of the signal candidate pixel in a frame detected at the same timing as that of detection of the brightness value of the surrounding pixel, in other words, in the same frame as that in which the brightness value of the surrounding pixel is detected.

Figure 6B:
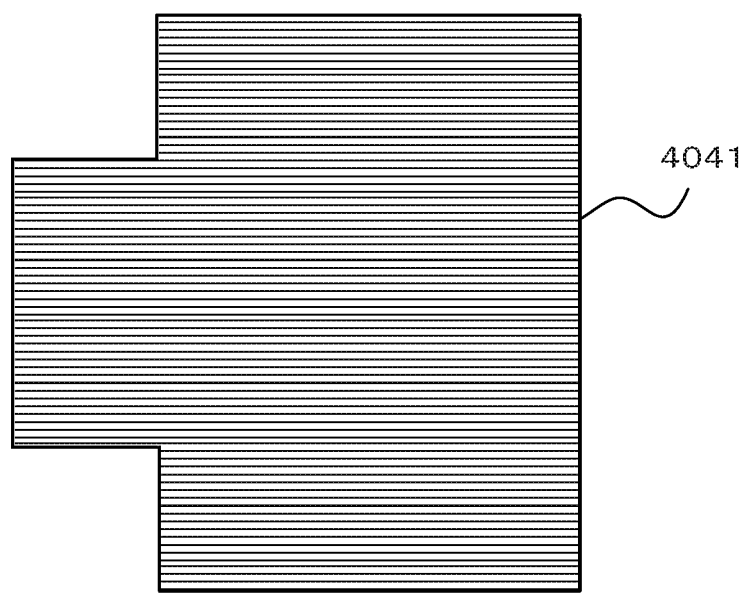
FIG. 6B is a view illustrating one example of a green RGB image according to the embodiment.
Figure 7B:
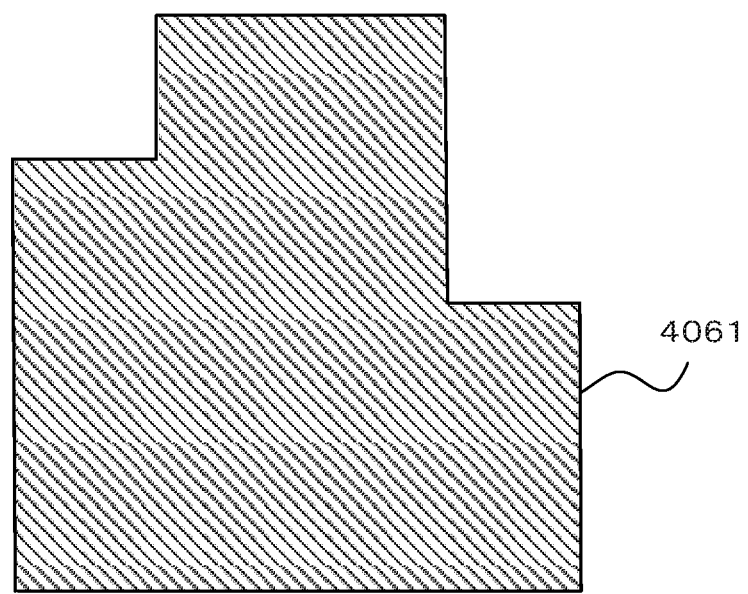
FIG. 7B is a view illustrating one example of a blue RGB image according to the embodiment.

Next, for a brightness value of an outermost pixel that is among a set of pixels having the same brightness value as that of the signal candidate pixel and that is included in the outermost portion of a width of one pixel, the signal candidate region detector 336 makes the brightness value of the outermost pixel less than the current brightness value. Next, the signal candidate region detector 336 (i) identifies the set of pixels having the same brightness value as that of the signal candidate pixel, such as, for example, a red signal candidate region 4021 illustrated in FIG. 5B, a green signal candidate region 4041 illustrated in FIG. 6B, and a blue signal candidate region 4061 illustrated in FIG. 7B and (ii) detects the outline of such a signal candidate region.

The information acquirer 338 determines the color phases in the signal candidate regions 4021, 4041 and 4061 identified by the above-described processing and decodes the information on the ID of the mobile device 100 or the like based on changes in the color phases in the time direction.

As necessary, the development element 340 generates a color image (RGB image) from analog data on the frames based on a signal from the brightness value acquirer 332. Additionally, the development element 340 makes the display 307 display the generated RGB image. Also, the present disclosure may use a configuration in which, in addition to the RGB image, information on an association with the ID of the mobile device 100 acquired by the information acquirer 338 or the like may be output to and displayed by the display 307.

Figure 10:
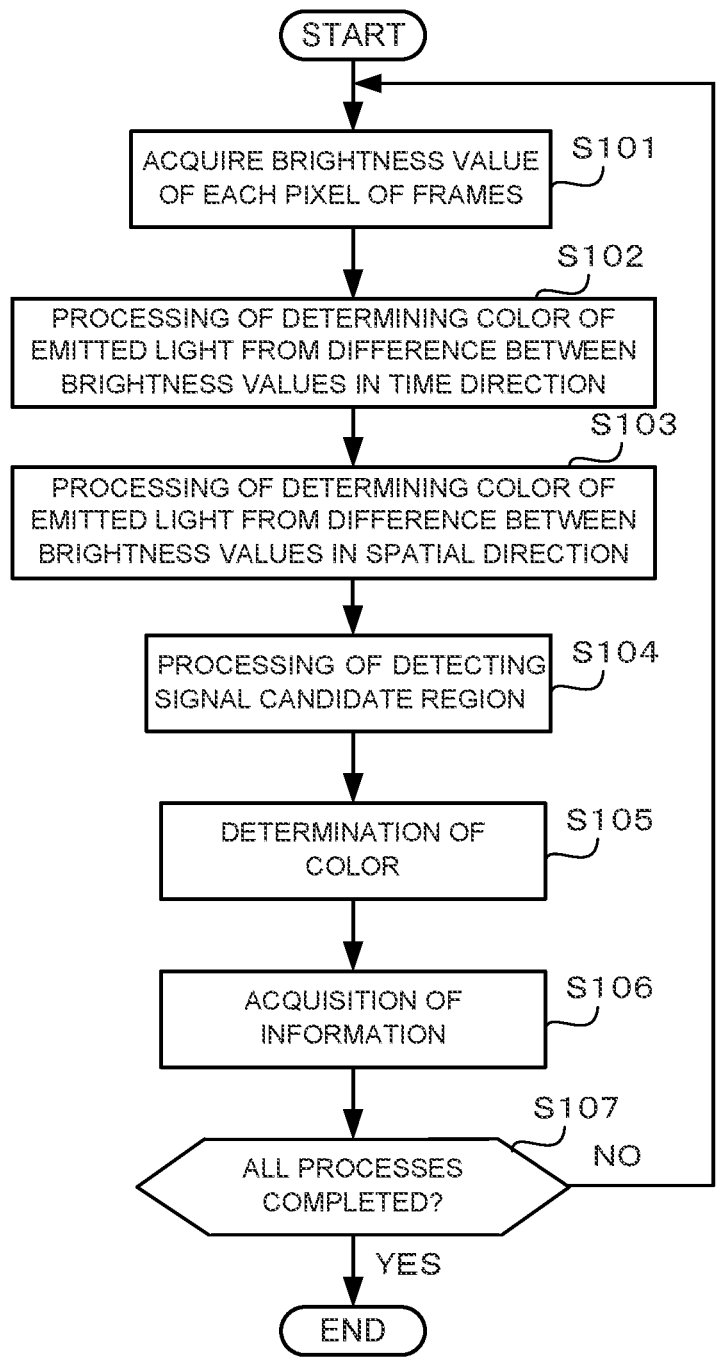
FIG. 10 is a flow chart illustrating one example of operation of information acquisition by the server according to the embodiment.

The operation of color estimation is described below with reference to flow charts. FIG. 10 is a flow chart illustrating one example of the operation of image acquisition by the server 300.

For each of frames output by the imaging element 202 in the controller 302 of the server 300, a brightness value of each of such pixels forming the frames is acquired. Additionally, the position acquirer 334 acquires, at times corresponding to the frames, the brightness value of each of the pixels acquired by the brightness value acquirer 332 (step S101).

That is, the controller 302 acquires, for each frame, a brightness value corresponding to a position of each filter from the light receiving device including the light receiving elements whose light receiving surfaces are covered with the color filters (for example, Bayer filters) including filters (for example, red) transmitting light of a wavelength band corresponding to the first color (for example, red) and filters transmitting light of a wavelength band corresponding to the second color.

Next, the position acquirer 334 performs processing by focusing attention on each of pixels forming the frames one by one and using differences between brightness values of the attention-focused pixels in the frame, that is, processing of determining a color of emitted light from the differences between the brightness values in the time direction (step S102).

That is, the controller 103 determines the color of emitted light based on the brightness values acquired for each frame.

Figure 11:
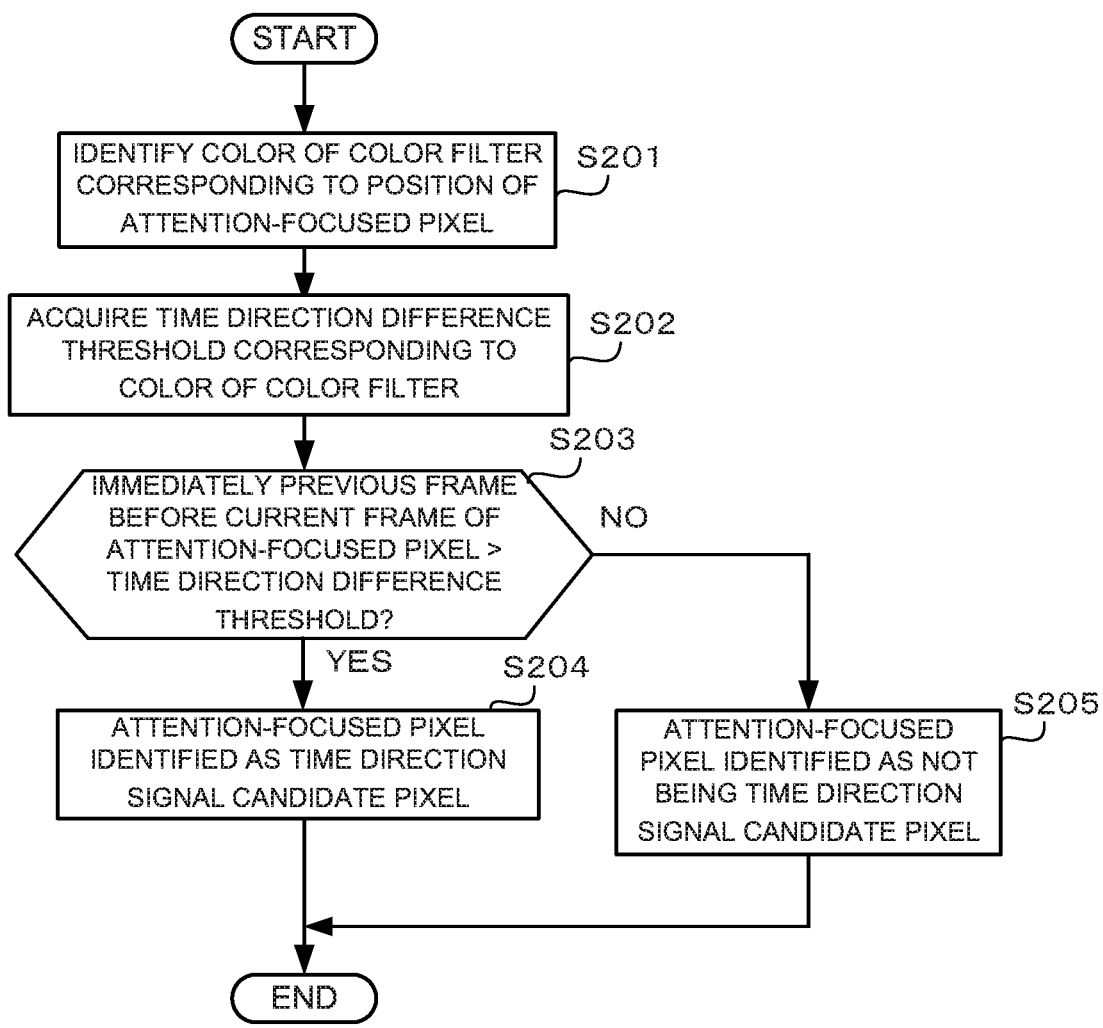
FIG. 11 is a flow chart illustrating one example of operation of processing of determining a color of emitted light from a difference between brightness values with passage of time by the server according to the embodiment.

FIG. 11 is a flow chart illustrating one example of the operation of processing of determining by the server 300 a color of emitted light from the differences between brightness values in the time direction. The position acquirer 334 identifies, based on the information on color filters of the Bayer array stored in the memory 305 and the positions of the attention-focused pixels, colors of color filters corresponding to the positions of the attention-focused pixels (step S201).

Next, the position acquirer 334 acquires, from the memory 305, the time direction difference thresholds corresponding to the identified colors of the color filters (step S202).

Next, position acquirer 334 determines whether, regarding the attention-focused pixels, the difference obtained by subtracting the brightness value of the immediately previous frame from the brightness value of the current frame is greater than the time direction difference threshold (step S203).

In a case in which the difference obtained by subtracting the brightness value of the immediately previous frame from the brightness value of the current frame regarding the attention-focused pixels is greater than the time direction difference threshold (YES in step S203), the position acquirer 334 identifies the attention-focused pixels as pixels (time direction signal candidate pixels) that are likely to be located at the positions of the LED 102 (step S204). On the other hand, in a case in which the difference obtained by subtracting the brightness value of the immediately previous frame from the brightness value of the current frame regarding the attention-focused pixels is not greater than the time direction difference threshold (No in step S203), the position acquirer 334 identifies the attention-focused pixels as not being the signal candidate pixels (step S205).

Description continues again with reference to FIG. 10. After the processing of determining the color of emitted light from the differences between the brightness values in the time direction in step S102, the position acquirer 334 performs processing using a difference between brightness values of the time direction signal candidate pixel and the surrounding pixel, that is, processing of determining the color of the emitted light from the difference between the brightness values in the spatial direction (step S103).

That is, the controller 103 determines the color of emitted light based on a difference between a brightness value at a position of a given filter and a brightness value of a surrounding pixel located around the given filter.

Figure 12:
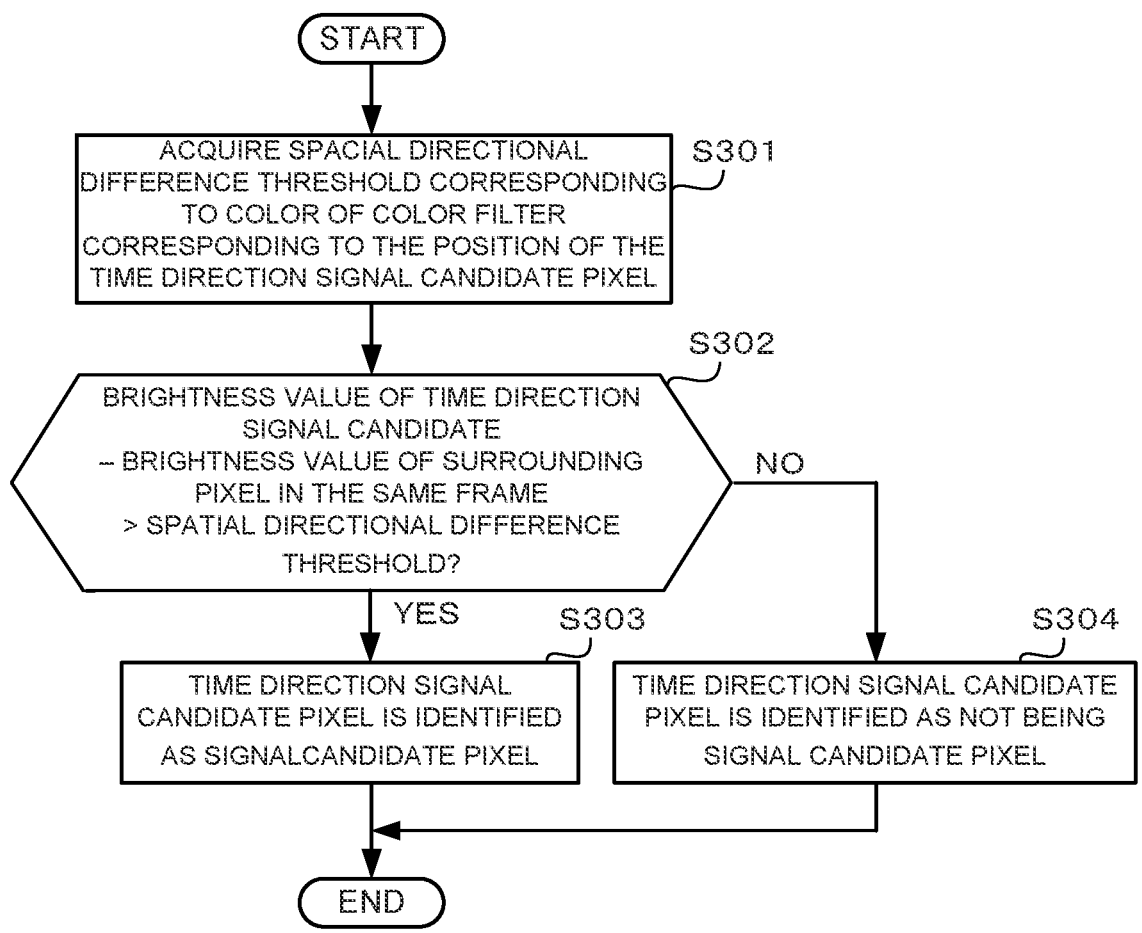
FIG. 12 is a flow chart illustrating one example of operation of processing of determining a color of emitted light from a difference between brightness values in a spatial direction by the server according to the embodiment.

FIG. 12 is a flow chart illustrating one example of the operation of processing of determining the color of the emitted light from the difference between the brightness values in the spatial direction by the server 300. The position acquirer 334 identifies the color of the color filter corresponding to the position of the time direction signal candidate pixel. Additionally, the position acquirer 334 acquires the spatial directional difference threshold corresponding to the identified color of the color filter (step S301).

Next, the position acquirer 334 determines, from the brightness value of the time direction signal candidate pixel, whether a difference obtained by subtracting, from the brightness value of the time direction signal candidate pixel, a brightness value of a surrounding pixel in the same frame in which the brightness value of the time direction signal candidate pixel is detected is greater than the spatial directional difference threshold (step S302).

In a case in which the calculated difference is greater than the spatial directional difference threshold (YES in step S302), the position acquirer 334 identifies the time direction signal candidate pixel as the signal candidate pixel (step S303). For example, a total of four pixels located on the left, right, top, and bottom of the signal candidate pixel are taken to be surrounding pixels, and the position acquirer 334 calculates differences by subtracting, from the brightness value of the time direction signal candidate pixel, a brightness value of each of the four pixels. Next, the position acquirer 334 (i) determines whether three or more differences of the four calculated differences are greater than the spatial directional difference threshold and (ii) identifies the time direction signal candidate pixel as the signal candidate pixel when three or more differences of the four calculated differences are greater than the spatial directional difference threshold. On the other hand, if three or more differences of the four calculated differences are not greater than the spatial directional difference threshold (NO in step S302), the position acquirer 334 identifies the time direction signal candidate pixel as not being the signal candidate pixel (step S304).

Description continues again with reference to FIG. 10. After the processing of determining the color of emitted light from the differences between the brightness values in the spatial direction in step S103, the signal candidate region detector 336 performs processing of detecting a region of the final signal candidate (step S104).

Figure 13:
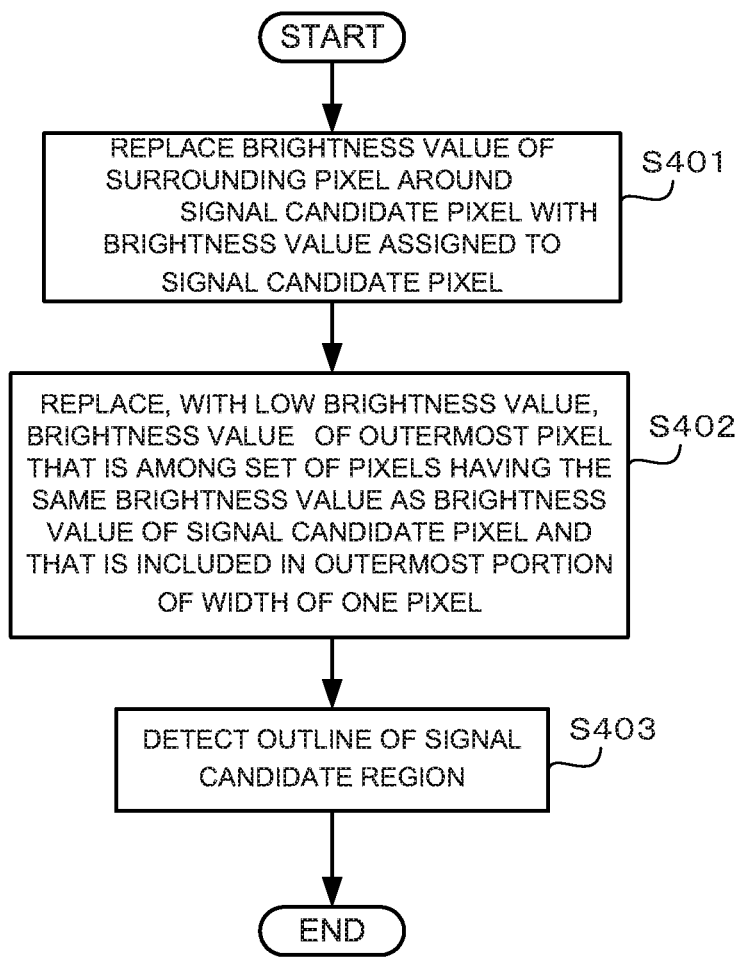
FIG. 13 is a flow chart illustrating one example of operation of processing of detecting a signal candidate region by the server according to the embodiment.

FIG. 13 is a flow chart illustrating one example of the operation of processing of detecting the signal candidate region by the server 300. The signal candidate region detector 336 (i) replaces the signal candidate pixel with a previously assigned brightness value and (ii) further replaces a brightness value of a surrounding pixel existing around the signal candidate pixel with a brightness value that is previously assigned to the signal candidate pixel in the same frame as that of the surrounding pixel (step S401). For example, a total of four pixels located on the left, right, top, and bottom of the signal candidate pixel are taken to be surrounding pixels, and the signal candidate region detector 336 replaces brightness values of the surrounding pixels with the brightness value that is assigned to the signal candidate pixel in the same frame as that of the surrounding pixel.

Next, for a brightness value of an outermost pixel that is among a set of pixels having the same brightness value as that of the signal candidate pixel and that is included in the outermost portion of a width of one pixel, the signal candidate region detector 336 substitutes, for the brightness value of the outermost pixel, a brightness value less than the current brightness value (step S402).

Next, the signal candidate region detector 336 (i) identifies, as a signal candidate region, the set of pixels having the same brightness value as that of the signal candidate pixel and (ii) detects the outline of the signal candidate region (step S403).

Description continues again with reference to FIG. 10. After the processing of detecting the signal candidate in step S104, the information acquirer 338 (i) determines which of RGB the signal candidate region is and (ii) determines a change in a color phase of this signal candidate region in the time direction (step S105). Additionally, the information acquirer 338 decodes, based on the change in the color phase, the information on the ID of the mobile device 100 or the like and then acquires the information (step S106).

Afterward, the controller 302 determines whether all the processing for the information acquisition is completed (step S107). Specifically, the controller 302 determines whether the processes in steps S101 to S106 are completed for all of the pixels included in the frames. In a case in which all the processing for the information acquisition is completed (YES in step S107), the controller 302 finishes the series of processing. In a case in which all the processing for the information acquisition is not completed (NO in step S107), the controller 302 repeats the processes after step S101. For example, in a case in which, among all of the pixel forming the frames, there is a pixel for which the processes in steps S101 to S106 are not completed, the controller 302 regards such a pixel as an attention-focused pixel and repeats the processes after step S101 for this pixel.

In the present embodiment in this manner, the mobile device 100 makes the LED 102 as a marker emit light in accordance with the ID of the mobile device 100 or the like. On the other hand, the server 300 (i) acquires frames acquired by imaging with the camera 200, (ii) performs the processing using a difference between brightness values of the attention-focused pixels in the frames by focusing attention on each of the pixels forming the frames one by one (the processing of determining a color of emitted light from the differences between brightness values in the time direction), and (iii) determines whether there is a probability that the attention-focused pixels are the signal candidate pixels. Additionally, in a case in which there is a probability that the attention-focused pixels are the signal candidate pixels (time direction signal candidate pixels), the server 300 (i) performs processing using the difference between the brightness values of the time direction signal candidate pixels and the surrounding pixel, that is, processing of determining a color of emitted light from a difference between brightness values in the spatial direction and (ii) identifies the signal candidate pixel and the signal candidate region.

Figure 5B:
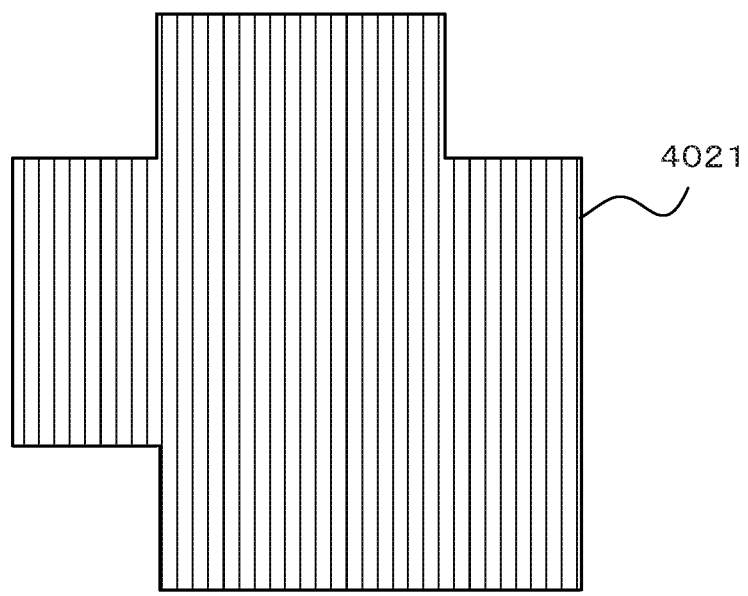
FIG. 5B is a view illustrating one example of a red RGB image according to the embodiment.

Conventionally, the signal candidate region is identified after generating the RGB image illustrated in FIG. 5B or the like in the prior art. On the other hand, in the present embodiment, the server 300 can identify the signal candidate region and further perform image acquisition when the server 300 acquires a brightness value of each of the pixels in the frames, thereby enabling, even when resolution increases, a reduction in influence on identification of a light receiving position of a signal source (signal candidate region).

That is, in the present embodiment, the controller 103 acquires information concerning the mobile device without developing a color image from a light reception image acquired from the light receiving elements.

Also, the server 300 (i) performs the processing using the difference between the brightness values of the attention-focused pixels in the frames (the processing of determining the color of emitted light from the difference between the brightness values in the time direction) and (ii) identifies the attention-focused pixel as the time direction signal candidate pixel that is likely to be the signal candidate pixel when the difference between the brightness values in the frames for the attention-focused pixels is greater than the time direction difference threshold, thereby preventing the attention-focused pixel from being wrongly identified as the signal candidate pixel in a case in which the attention-focused pixel has a high brightness value even though the attention-focused pixel is not located at a position of the LED 102, for example, in a case in which a space is bright.

Also, the server 300 (i) performs the processing using the difference between the brightness value of the time direction signal candidate pixel and the brightness value of the surrounding pixel, that is, the processing of determining the color of emitted light from the difference between the brightness values in the spatial direction and (ii) identifies the time direction signal candidate pixel as the signal candidate pixel when the difference between the brightness values of the time direction signal candidate pixel and the surrounding pixel is greater than the spatial directional difference threshold, thereby enabling accurate identification of the signal candidate pixel while taking into consideration that the brightness value of the time direction signal candidate pixel becomes high and the brightness value of the surrounding pixel becomes low when the LED 102 emits light having a color of a color filter corresponding to the time direction signal candidate pixel.

Also, the server 300 replaces the brightness value of the surrounding pixel located around the signal candidate pixel with the brightness value of the signal candidate pixel in the same frame in which the brightness value of the surrounding pixel is detected, to broaden the region having a single color, thereby preventing pieces of information on the signal candidate pixel from being decoded one by one.

Also, for a brightness value of an outermost pixel that is among a set of pixels having the same brightness value as that of the signal candidate pixel and that is included in the outermost portion of a width of one pixel, the server 300 replaces the brightness value of the outermost pixel with a brightness value that is less than the current brightness value, thereby enabling accurate identification of the position of the LED 102 regarding the signal candidate region and enabling a reduction in influence of noise such as reflected light.

Additionally, the present disclosure is not limited to the description and the drawings of the above-described embodiment, and the content of the description and the drawings of the above-described embodiment can be appropriately changed.

For example, although a total of four pixels located on the left, right, top, and bottom of the signal candidate pixel are set to be surrounding pixels in the above-described embodiment, the number of the surrounding pixels is not limited to such a number, and for example, the number of the surrounding pixels may be one. Alternatively, all of or a part of eight pixels located around the signal candidate pixel may be set to be the surrounding pixels.

Also, in the above-described embodiment, the example is described in which a total of four pixels located on the left, right, top, and bottom of the time direction signal candidate pixel are set to be surrounding pixels, and the position acquirer 334 (i) calculates the differences by subtracting, from the brightness value of the time direction signal candidate pixel, the brightness value of each of the four pixels and (ii) determines whether three or more differences of the four calculated differences are greater than the spatial directional difference threshold. However, the number of the differences that are greater than the spatial directional difference threshold and used for the determination is not limited to such numbers. For example, the position acquirer 334 may be configured to (i) determine whether all of the calculated differences obtained by subtracting, from the brightness value of the time direction signal candidate pixel, the brightness value of each of the surrounding pixels are greater than the spatial directional difference threshold and (ii) identify the time direction signal candidate pixel as the signal candidate pixel when all of the calculated differences are greater than the spatial directional difference threshold.

Also, in the above-described embodiment, although a case is described in which three types of visible light having a red color, a green color and a blue color are used for communication, visible light having another color may be used. Also, the techniques of the present disclosure are applicable to visible light communication of information is performed by modulation only by a change in brightness in the time direction.

Also, arrangement of the color filters in the present disclosure is not limited to the Bayer array, and another arrangement of the color filters may be used. In accordance with the arrangement of the color filters, information associating the colors of the color filters with the positions of the colors is stored in the memory 305.

Also, although information on the transmission subject to be transmitted by the mobile device 100 is the ID of the mobile device 100 in the above-described embodiment, the present disclosure is not limited to such information, and the information on the transmission subject to be transmitted by the mobile device 100 may be information on a position of the mobile device 100, information on a fault occurring in the mobile device 100, or the like.

Also, the light source in the mobile device 100 is not limited to the LED. For example, the light source may be included in a portion of the LCD, the PDP, the EL display or the like.

Also, the camera 200 may be installed inside the server 300.

Also, in the above-described embodiment, a system that executes the aforementioned processes may be achieved by storing an executed program in a computer-readable recording medium, such as a flexible disc, a compact disc read only memory (CD-ROM), a digital versatile disc read only memory (DVD-ROM), or a magneto-optical disc (MO) for distribution and installing the computer program in the personal digital assistant or the like.

Also, the program may be previously stored in a disc device or the like included in a predetermined server on a communication network, such as the Internet and be downloaded, for example, with the program superimposed on a carrier wave.

Also, in a case in which the above described functions are shared by operating system (OS) or performed in cooperation with the OS and an application program, just portions other than the OS may be stored in a recording medium and the recording medium may be distributed, the portions other than the OS may be downloaded, or the like.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An information acquisition method implemented by one or more processors, comprising:
   acquiring, for each of frames, a brightness value corresponding to a position of a color filter from a light receiving device comprising light receiving elements whose light receiving surfaces are covered with color filters, the color filters including the color filter and the color filters comprising at least first color filters transmitting light of a wavelength band corresponding to a first color and second color filters transmitting light of a wavelength band corresponding to a second color;
   detecting a signal candidate region in the frames based on a difference in brightness values of the position acquired from a plurality of frames and at least one of a threshold for the first color filters and a threshold for the second color filters, the signal candidate region being detected without generating a color image; and
   acquiring information about a mobile device based on the difference between brightness values of the position acquired from the plurality of frames in the signal candidate region and said at least one of the threshold for the first color filters and the threshold for the second color filters.

2. The method according to claim 1, further comprising: acquiring the information about the mobile device based on color information determined from the difference without generating a color image.

3. The method according to claim 1, wherein
   the color filters comprise red filters, green filters, and blue filters, and
   the threshold is set for each of the red filters, the green filters, and the blue filters.

4. The method according to claim 3, wherein
   a value of the threshold differs in accordance with color of the red filters, the green filters and the blue filters.

5. The method according to claim 1, further comprising:
   determining a color of emitted light based on (i) a value of the difference between brightness values of the plurality of frames and (ii) the threshold; and
   acquiring the information about the mobile device based on the determined color of the emitted light.

6. The method according to claim 5, further comprising:
   determining the color of the emitted light based on (i) the difference between brightness values at the position of the color filter in a plurality of frames and (ii) brightness values at a plurality of positions around the position in at least one frame of the plurality of frames.

7. The method according to claim 5, further comprising:
   acquiring, based on a color change pattern in which the color of the emitted light changes with a passage of time, identification information of the mobile device.

8. An information acquisition device comprising:
   one or more processors that are configured to:
   acquire, for each of frames, a brightness value corresponding to a position of a color filter from a light receiving device comprising light receiving elements whose light receiving surfaces are covered with color filters, the color filters including the color filter and the color filters comprising at least first color filters transmitting light of a wavelength band corresponding to a first color and second color filters transmitting light of a wavelength band corresponding to a second color;
   detect a signal candidate region in the frames based on a difference in brightness values of the position acquired from a plurality of frames and at least one of a threshold for the first color filters and a threshold for the second color filters, the signal candidate region being detected without generating a color image; and
   acquire information about a mobile device based on the difference between brightness values of the position acquired from the plurality of frames in the signal candidate region and said at least one of the threshold for the first color filters and the threshold for the second color filters.

9. The information acquisition device according to claim 8, wherein
   the one or more processors are configured to acquire the information about the mobile device without developing a color image from a light reception image obtained by the light receiving elements.

10. The information acquisition device according to claim 8, wherein
    the color filters comprise red filters, green filters, and blue filters, and
    the threshold is set for each of the red filters, the green filters, and the blue filters.

11. The information acquisition device according to claim 10, wherein
    a value of the threshold differs in accordance with color of the red filters, the green filters and the blue filters.

12. The information acquisition device according to claim 8, wherein the one or more processors are configured to:
    determine a color of emitted light based on (i) a value of the difference between the brightness values of the frames and (ii) the threshold; and
    acquire the information about the mobile device based on the determined color of the emitted light.

13. The information acquisition device according to claim 12, wherein the one or more processors are configured to:
    determine the color of the emitted light based on (i) the difference between brightness values at the position of the color filter in a plurality of frames and (ii) brightness values at a plurality of positions around the position in at least one frame of the plurality of frames.

14. The information acquisition device according to claim 12, wherein the one or more processors are configured to:
    acquire, based on a color change pattern in which the color of the emitted light changes with a passage of time, identification information of the mobile device.

* * * * *